(12) United States Patent
Yao (10) Patent No.: US 10,218,190 B2
(45) Date of Patent: Feb. 26, 2019

(54) BATTERY APPARATUS AND CELL BALANCING CIRCUITS

(71) Applicant: Texas Instruments Incorporated, Dallas, TX (US)

(72) Inventor: Chidong Yao, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 267 days.

(21) Appl. No.: 15/190,252

(22) Filed: Jun. 23, 2016

(65) Prior Publication Data

US 2017/0244258 A1 Aug. 24, 2017

Related U.S. Application Data

(63) Continuation of application No. PCT/CN2016/074332, filed on Feb. 23, 2016.

(51) Int. Cl.
*H02J 7/00* (2006.01)
(52) U.S. Cl.
CPC .......... *H02J 7/0019* (2013.01); *H02J 7/0021* (2013.01); *H02J 7/0093* (2013.01)
(58) Field of Classification Search
CPC ....... Y02E 60/12; H02J 7/0054; H02J 7/1423; H01M 10/44; H01M 10/46
USPC ........................................................ 320/103
See application file for complete search history.

(56) References Cited

U.S. PATENT DOCUMENTS

| | | | |
|---|---|---|---|
| 6,577,135 B1 | 6/2003 | Matthews et al. | |
| 9,130,377 B2 | 9/2015 | Barsukov et al. | |
| 2003/0222619 A1 | 12/2003 | Formenti et al. | |
| 2010/0182805 A1* | 7/2010 | Nishihara | H02M 1/08 363/21.02 |
| 2011/0084668 A1* | 4/2011 | Nakao | H01M 10/441 320/149 |
| 2011/0115436 A1* | 5/2011 | Zhang | B60L 11/1861 320/134 |

(Continued)

FOREIGN PATENT DOCUMENTS

| | | |
|---|---|---|
| CN | 102222957 A | 10/2011 |
| CN | 102496983 A | 6/2012 |
| JP | 2013233028 A | 11/2013 |

OTHER PUBLICATIONS

Search Report for PCT Application No. PCT/CN2016/074332, dated Nov. 30, 2016 (1 page).

*Primary Examiner* — Arun C Williams
(74) *Attorney, Agent, or Firm* — Tuenlap Chan; Charles A. Brill; Frank D. Cimino (57) ABSTRACT

Disclosed examples include battery apparatus and balancing circuits for transferring charge between one or more of a plurality of battery cells and a second battery, in which a battery is coupled with a first winding of a transformer, and the second battery is coupled with a second transformer winding. A first transistor is turned on to allow current flow in the first winding to discharge the first battery, and then the first transistor is turned off. The resulting induced voltage in the second winding turns on a second transistor to provide flyback active charge balancing to charge the second battery. A signal from the third winding allows detection of low or zero current flow in the second winding for a controller to begin subsequent charge transfer cycles for full isolation between the first and second batteries.

20 Claims, 6 Drawing Sheets

(56) References Cited

U.S. PATENT DOCUMENTS

| | | | |
|---|---|---|---|
| 2011/0169452 A1 | 7/2011 | Cooper et al. | |
| 2011/0234164 A1* | 9/2011 | Furukawa | H02J 7/0018 320/118 |
| 2012/0086390 A1* | 4/2012 | Lim | H02J 7/0019 320/107 |
| 2012/0105009 A1 | 5/2012 | Yao | |
| 2012/0139547 A1 | 6/2012 | Chen et al. | |
| 2012/0326671 A1* | 12/2012 | Krause | H01M 10/44 320/126 |
| 2013/0002203 A1* | 1/2013 | Kuraishi | H02J 7/0018 320/134 |
| 2014/0077752 A1 | 3/2014 | Barsukov et al. | |

\* cited by examiner

BATTERY APPARATUS AND CELL BALANCING CIRCUITS

REFERENCE TO RELATED APPLICATION

This application is a continuation of, and claims priority to and the benefit of, copending International Application No. PCT/CN2016/074332 with an international filing date of Feb. 23, 2016 and entitled "BATTERY APPARATUS AND CELL BALANCING CIRCUITS", which designated the United States and is hereby fully incorporated by reference for all purposes.

TECHNICAL FIELD

The present disclosure relates generally to battery charging and balancing systems, and more particularly to battery apparatus and balancing circuits.

BACKGROUND

Batteries are used in a wide variety of products and systems, and many batteries are rechargeable. For example, Lithium ion (Li-ion) batteries are used in various products and offer high energy density and economy compared to other existing mobile and backup power supply solutions. However, the chemistry of Li-ion battery technology is limited with respect to electromotive force (EMF). As a result, multiple Li-ion cell batteries are often connected in series with one another in an array or battery pack to support high voltage applications like hybrid or Battery Electric Vehicles (BEVs), energy storage systems, and the like. In operation, a set or stack of series-connected cell batteries are subjected to discharging to drive a load, as well as charging operations. In addition, voltage balancing operations and systems have been developed to balance the voltages of the individual cell batteries to extend operational life of the battery pack. The cell balancing can be accomplished by transferring charge from one cell battery in a stack to another stack cell battery, or by transferring charge between a cell battery and an external battery dedicated to charging and discharging operations for cell balancing or other purposes.

Various cell balancing approaches have been developed, including passive balancing and active balancing solutions. Passive balancing involves discharging cells with a higher or highest voltage, and passive balancing is generally cost effective compared with active solutions. However, the efficiency and performance of passive balancing is generally poor compared to active approaches. Some active balancing solutions use DC-DC converters and transformers to transfer energy from one battery to another. For stacks of multiple batteries, bulky active balancing circuitry is often required, due to the large number of cells connected in series for high voltage applications. As a result, active balancing systems are typically higher cost compared with passive balancing solutions.

SUMMARY

Disclosed examples include battery apparatus and balancing circuits to transfer charge between batteries. In one example, a switching circuit selectively connects one or more of a plurality of cell batteries to a balancing circuit for charge transfer between the selected first battery and a second battery. An example balancing circuit includes a transformer with a first winding coupled with the first battery, a second winding coupled with a second battery, and a third winding. A first transistor is coupled between the first battery and the first winding, and a second transistor is coupled between the second battery and the second winding. A control circuit turns the first transistor on to allow current flow in the first winding and to cause an induced voltage in the second and third windings. In one example, the control circuit turns the first transistor off when a current flowing in the first winding reaches a threshold value. Turning the first transistor off induces a voltage in the second winding. The second transistor operates in response to the induced voltage in the second winding to allow current flow between the second winding and the second battery to charge the second battery. The third winding provides a signal indicating current flow in the second winding. The control circuit starts a new charge transfer cycle by again turning the first transistor on in response to the signal from the third winding reaching a predetermined value. Disclosed examples facilitate bidirectional charge transfer for battery cell balancing. In certain examples, a second control circuit controls a third transistor coupled between the second battery and the second transformer winding to allow current flow from the second battery, which causes an induced voltage in the first winding to turn on a fourth transistor to allow current to flow from the first winding to the first battery.

DETAILED DESCRIPTION

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the term "couple" or "couples" is intended to include indirect or direct electrical connection or combinations thereof. For example, if a first device couples to or is coupled with a second device, that connection may be through a direct electrical connection, or through an indirect electrical connection via one or more intervening devices and connections.

Figure 1:
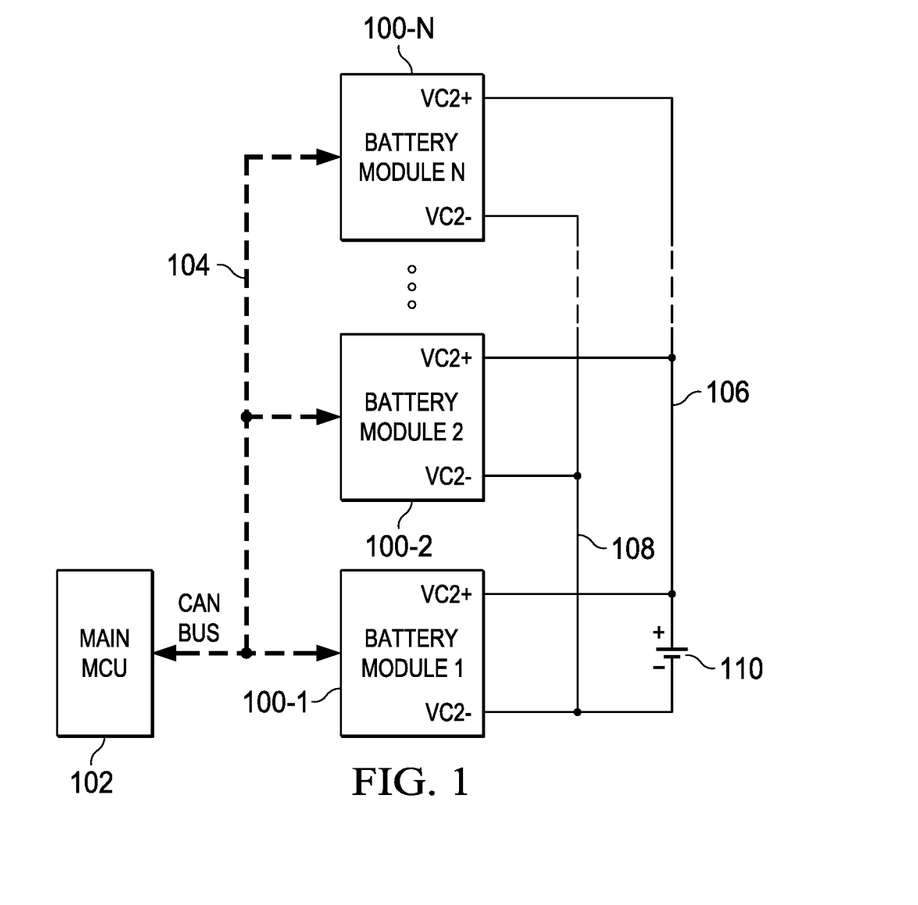
FIG. 1 is a diagram of a battery system including multiple battery modules connected to a main processor and to a common public battery.

FIG. 1 shows a system including an integer number N battery modules 100-1, 100-2, . . . 100-N connected to a main processor 102 (designated MAIN MCU in the drawing) via a network or communications connection 104. Any suitable communications connection 104 can be used, for example, an isolated CAN bus. The battery modules 100 individually include positive and negative cell voltage connections 106 and 108, respectively (labeled VC2+ and VC2− in the drawings) for connection to positive and negative terminals of a common or "public" battery 110. The common battery 110 can be a single battery as schematically shown in FIG. 1, or can be a collection of two or more individual batteries connected in any suitable series, parallel or combination series/parallel arrangement (not shown), referred to herein as a second battery.

Figure 2:
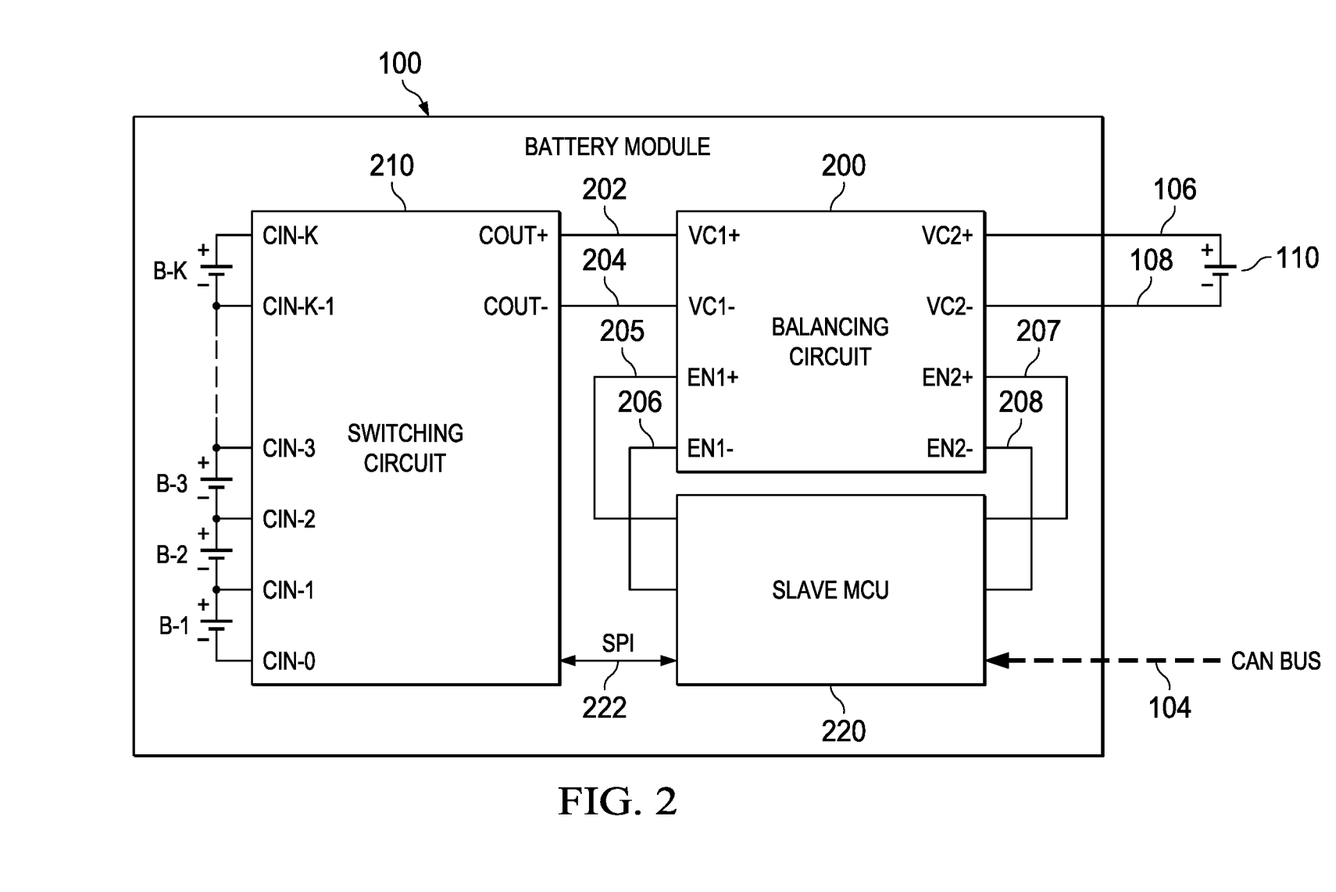
FIG. 2 is a diagram of a battery module in the system of FIG. 1, including a stack of series-connected battery cells, a switching circuit, a balancing circuit, and a slave processor.

FIG. 2 shows further details of a battery apparatus or module 100 that can be used in the system of FIG. 1. The battery apparatus 100 includes an integer number K first battery cells B-1, B-2, B-3, . . . B-K connected in series with one another, along with a balancing circuit 200, a switching circuit 210, and a slave processor (labeled SLAVE MCU in the drawings). The switching circuit 210 includes K+1 cell input connections CIN-0, CIN-1, CIN-2, CIN-3, . . . CIN-K providing connections to positive (+) and negative (−) terminals of the individual battery cells B-1 through B-K. The switching circuit 210 includes first and second switching circuit nodes 202 and 204 (capacitor output connections labeled COUT+ and COUT− in the drawings) respectively connected to positive and negative first cell voltage inputs VC1+ and VC1− of the balancing circuit 200. The switching circuit 210 operates according to control signals or messaging received via a communications connection 222 from the slave processor 220 to selectively couple the first and second switching circuit nodes 202 and 204 with a selected battery cell B or a selected group of the first battery cells B-1, B-2, . . . B-K. Any suitable communications connection 222 can be used, for example a serial peripheral interface (SPI) connection. The connected cell battery or batteries is/are referred to herein as a first battery.

Using the communications connection 222, the slave processor 220 can cause the switching circuit 210 to interconnect one or more selected battery cells B to the first cell voltage inputs VC1+ and VC1− for controlled charge transfer between the first battery/batteries B and the second battery 110. The slave processor 220 is operatively coupled with the main processor 100 to (FIG. 1) via the bus or network 104. The main processor 102 in one example implements a battery charging, discharging and/or balancing algorithm or process, including communicating with slave processors 220 of the individual battery modules 100, and the slave processors 200 provide control signals or messaging to the associated switching circuits 210 to select one or more of the battery cells B for charging or discharging. In the illustrated example, the balancing circuit 200 includes second cell voltage inputs VC2+ and VC2− connected to the second battery 110 via the connections 106 and 108. In other possible implementations, the second cell voltage inputs VC2+ and VC2− of the individual balancing circuits 200 can be connected to cell voltage outputs of another battery module 100 to allow charging or discharging for balancing of battery cells between modules 100. The selection of the battery cell or cells B for interconnection to the balancing circuit 200 can be done according to any suitable charging, discharging and/or balancing scheme or procedure.

The balancing circuit 200 in one example provides unidirectional charge transfer capability. In the illustrated examples, the balancing circuit 200 of the module 100 provides bidirectional charge transfer capability under control of the slave processor 220. The balancing circuit 200 in FIG. 2 includes positive and negative first enable signal inputs EN1+ and EN1− connected to receive a first enable signal EN1 from the slave processor 220 along lines 205 and 206. The slave processor 220 in this example provides a first enable signal EN1 along the lines 205 and 206 in order to enable charge transfer between the first and second switch circuit nodes 202 and 204 (VC1+ and VC1−) and the second battery 110. This allows discharging of a selected cell battery or cell batteries B to the public battery 110 in one example. The balancing circuit 200 in this case also includes second enable signal inputs EN2+ and EN2− connected to receive a second enable signal EN2 from the slave processor 220 along lines 207 and 208. The slave processor 220 can selectively provide the second enable signal EN2 along the lines 207 and 208 to provide charge transfer from the second battery 110 to the selected first battery cell or cells B.

Figure 3:
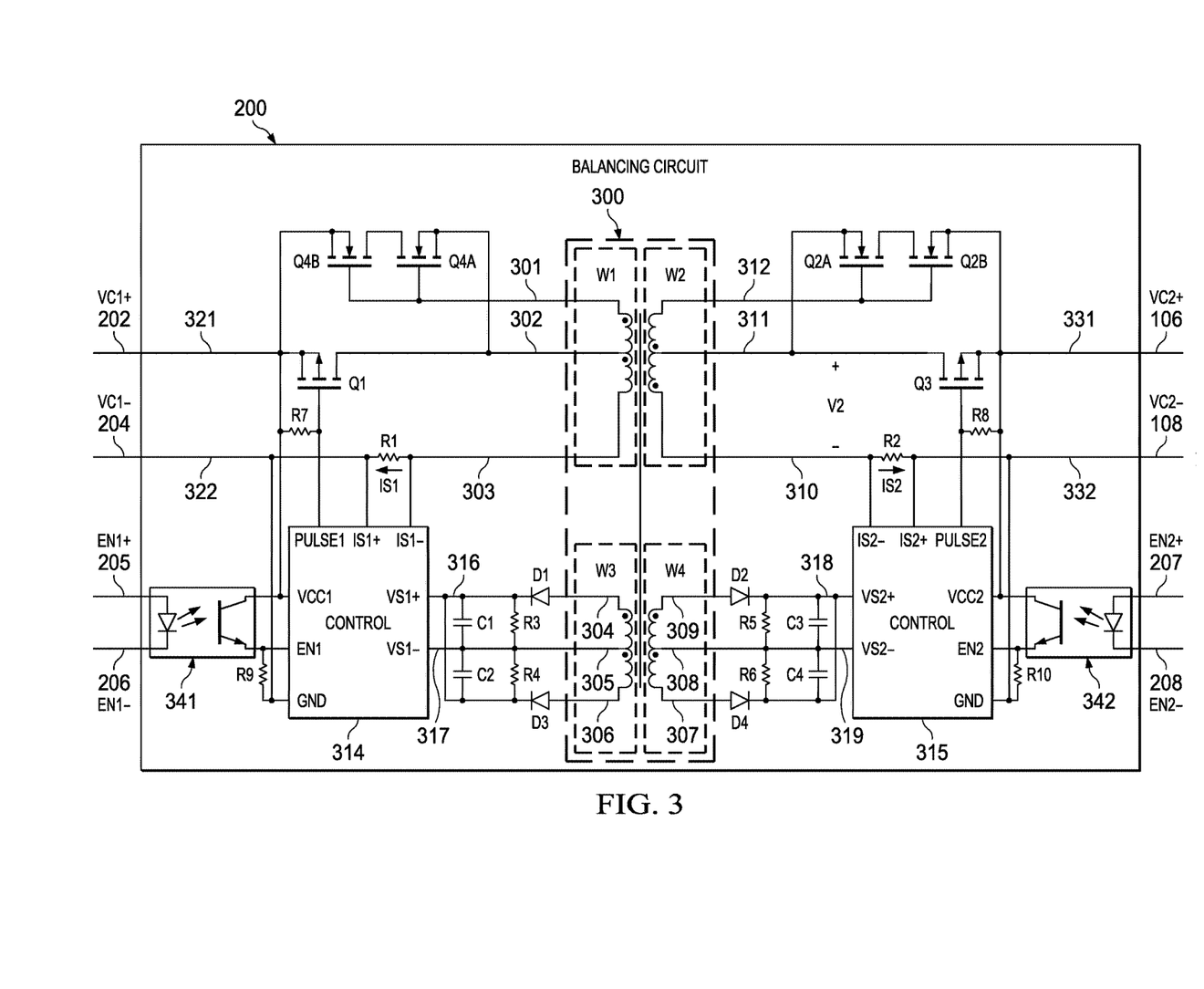
FIG. 3 is a schematic diagram illustrating a balancing circuit in the module of FIG. 2 to transfer charge between a selected battery cell and the public battery.

FIG. 3 illustrates further details of an example balancing circuit 200 in the battery apparatus 100 of FIG. 2. The balancing circuit 200 transfers charge between the selected battery cell B and a second battery 110, and this example provides bidirectional transfer capabilities. In the above-described system, for example, the main processor 102 (FIG. 1) can direct the charge transfer from one or more cell batteries B (FIG. 2) of a selected battery module 100 to the public second battery 110, with the local slave processor 220 providing a corresponding first enable signal EN1 to the associated balancing circuit 200 on lines 205 and 206. Alternatively, the main processor 102 can instruct the slave processor 220 of a selected battery module 100 to transfer charge from the second battery 110 to a selected battery cell or cells B by asserting the second enable signal EN2. In this manner, the illustrated examples show balancing systems to balance cell batteries B by charging from, or discharging to, the second battery 110. In other implementations, the second battery can be one or more selected cell batteries B of another group of batteries, for example, with the system including switching circuitry (not shown) for interconnection of the corresponding capacitor voltage terminals of two selected balancing circuits 200 to facilitate cell balancing by charge exchange between battery packs, without using a dedicated public battery 110.

The balancing circuit 200 in FIG. 3 includes a first pair of battery connections 321 and 322 to couple with the first battery B (e.g., through the switching circuit 210 of FIG. 2) via the first and second switching circuit nodes 202 and 204. The balancing circuit 200 also includes a second pair of battery connections 331 and 332 to couple with the second battery 110 via lines 106 and 108. The balancing circuit 200 also includes a transformer 300 with windings W1-W4 magnetically coupled with one another, for example, by being wound at least partially around corresponding portions of a common transformer core (not shown). In other examples, a unidirectional balancing circuit 200 can be constructed using three windings W1-W3. The windings W1-W4 are electrically isolated from one another, and are magnetically coupled with one another. The transformer 300 provides a galvanic isolation barrier between a primary side that includes the windings W1 and W3 as well as the circuit component shown on the left in FIG. 3, and a secondary side that includes the windings W2 and W4 and the circuitry shown on the right in FIG. 3.

The first transformer winding W1 includes a first end 301, a second end 303 and a center tap connection 302, and the winding W1 is coupled with the first pair of battery connections 321 and 322 for coupling with the first battery B. The third winding W3 includes first and second ends 304 and 306, as well as a center tap connection 305. The winding W3 is coupled to provide an input signal to a first rectifier circuit including rectifier diodes D1 and D3, resistors R3 and R4 and capacitors C1 and C2. The first rectifier circuit includes output nodes 316 and 317 which provide a first rectifier output voltage signal to voltage sense inputs VS1+ and VS1− of a first control circuit 314 in response to receiving a signal from the third winding W3. On the secondary side of the balancing circuit 200, the second winding W2 includes a first end 312, a second end 310 and a center tap 311. W2 is coupled with the second pair of battery connections 331 and 332 for coupling with the second battery 110. The fourth winding W4 includes first and second ends 307 and 309, as well as a center tap connection 308, and provides an input signal to a second rectifier circuit including rectifier diodes D2 and D4, resistors R5 and R6 and capacitors C3 and C4. A pair of second rectifier output nodes 318 and 319 provides a second rectifier output voltage signal to voltage sense inputs VS2+ and VS2− of a second control circuit 315 in response to receiving a signal from the fourth winding W4.

A first transistor Q1 is coupled between the first battery B and the first winding W1, and in one example includes a source terminal connected to the first battery connection 321 and a drain terminal connected to the center tap 302 of the first winding W1. The control terminal (e.g., gate) of the transistor Q1 is controlled by a pulse signal (labeled PULSE1 in the drawings) from the first control circuit 314. A resistor R7 is connected between the gate of Q1 and first battery connection 321. In one example, the first transistor Q1 is a P-channel field effect transistor which is turned on by a low PULSE1 signal from the first control circuit 314. A first resistor R1 is connected between the battery connection 322 and the lower or second end 303 of the transformer winding W1, and R1 serves as a current sense resistor to sense a current IS1 flowing in the first winding W1. The resulting current sense signal IS1 is provided as an input via input connections IS1+ and IS1− to the first control circuit 314.

The secondary side circuitry includes a second transistor Q2, in one example formed by a pair of series-connected N-channel transistors Q2A and Q2B with gate control terminals connected to the second end 312 of the second winding W2. The second transistors Q2 receive a signal from the end 312 of the second winding W2 responsive to current flow in the first winding W1, in order to allow current flow between the second winding W2 and the second pair of battery connections 331 and 332. In addition, a third transistor Q3 is connected between the center tap connection 311 of W2 and the battery connection 311. A resistor R8 is connected between the gate control terminal of Q3 and the battery connection 331. The third transistor Q3 is operated by the second control circuit 315 according to a second pulse control signal, labeled PULSE2 in the drawings. A second resistor R2 is coupled between the lower end 310 of the transformer winding W2 and the negative battery connection 332. R2 operates as a current sense resistor to provide a current sense signal IS2 at inputs IS2+ and IS2− of the second control circuit 315.

A fourth transistor Q4 is coupled between the first battery connection 321 and the center tap 302 of the first winding W1. In the illustrated example, the fourth transistor Q4 is implemented as a series-connected combination of two P-channel transistors Q4A and Q4B, with gate control terminals connected to the first end 301 of the winding W1. In other examples, the transistor pairs Q2A, Q2B and Q4A, Q4B can be replaced by a single transistor Q2 and a single transistor Q4. However, the use of two series connected transistors mitigates unwanted conduction through the body diode of a single MOSFET. For example, if Q4B were removed, the body diode of the remaining transistor Q4A could cause unwanted current flow when Q1 is turned off after the current flow through the R1 has transitioned above the threshold. Accordingly, the illustrated examples using transistor pairs Q4A, Q4B and Q2A, Q2B advantageously avoid this situation. In operation, the fourth transistor Q4A, Q4B receives a signal from the first end 301 of the first winding W1 responsive to current flow in the second winding W2 to allow current flow between the first winding W1 and the first pair of battery connections 321, 322. As seen in FIG. 3, the first transistor Q1 and the fourth transistor Q4A, Q4B are coupled in parallel with one another between the battery connection 321 and the first winding center tap connection 302. Similarly, the second transistor Q2A, Q2B and the third transistor Q3 are connected in parallel with one another between the center tap connection 311 of the winding W2 and the battery connection 331.

The balancing circuit 200 includes first and second opto-couplers 341 and 342 to facilitate operation under control of the slave processor 220 of FIG. 2. The first opto-coupler 341 receives the first enable signal EN1 from the slave processor 220 via the lines 205 and 206, and provides a first isolated enable signal to the first control circuit 314. In one example, the isolated first enable signal is provided in a first state as an active high voltage across a resistor R9 to an input EN1 of the first control circuit 314. On the secondary side, the second opto-coupler 342 receives the second enable signal from the slave processor 220 in a first state, and provides an active high second enable signal as a voltage across a resistor R10 to an input EN2 of the second control circuit 315. The first and second control circuits 314 and 315 each include a ground or reference input "GND". The first control circuit 314 includes a power supply input VCC1 that is powered via the VC1+ battery connection 321. The second control circuit 315 includes a power supply input VCC2 that is powered via the second battery connection 331. In the illustrated examples, the control circuits 314 and 315 are electrically and galvanically isolated from one another, and the respective ground connections are isolated from one another.

In operation to transfer charge from a first battery B connected to the first pair of battery connections 321, 322 to the second battery 110 connected to the second pair of battery connections 331, 332, the first control circuit 314 is enabled by the slave processor 220, and the second control circuit 315 remains disabled. Conversely, for transferring charge from the second battery 110 to the first battery B, the slave processor 220 enables the second control circuit 315 (e.g., via an active high second enable signal EN2) and the first control circuit 314 remains disabled.

Figure 4:
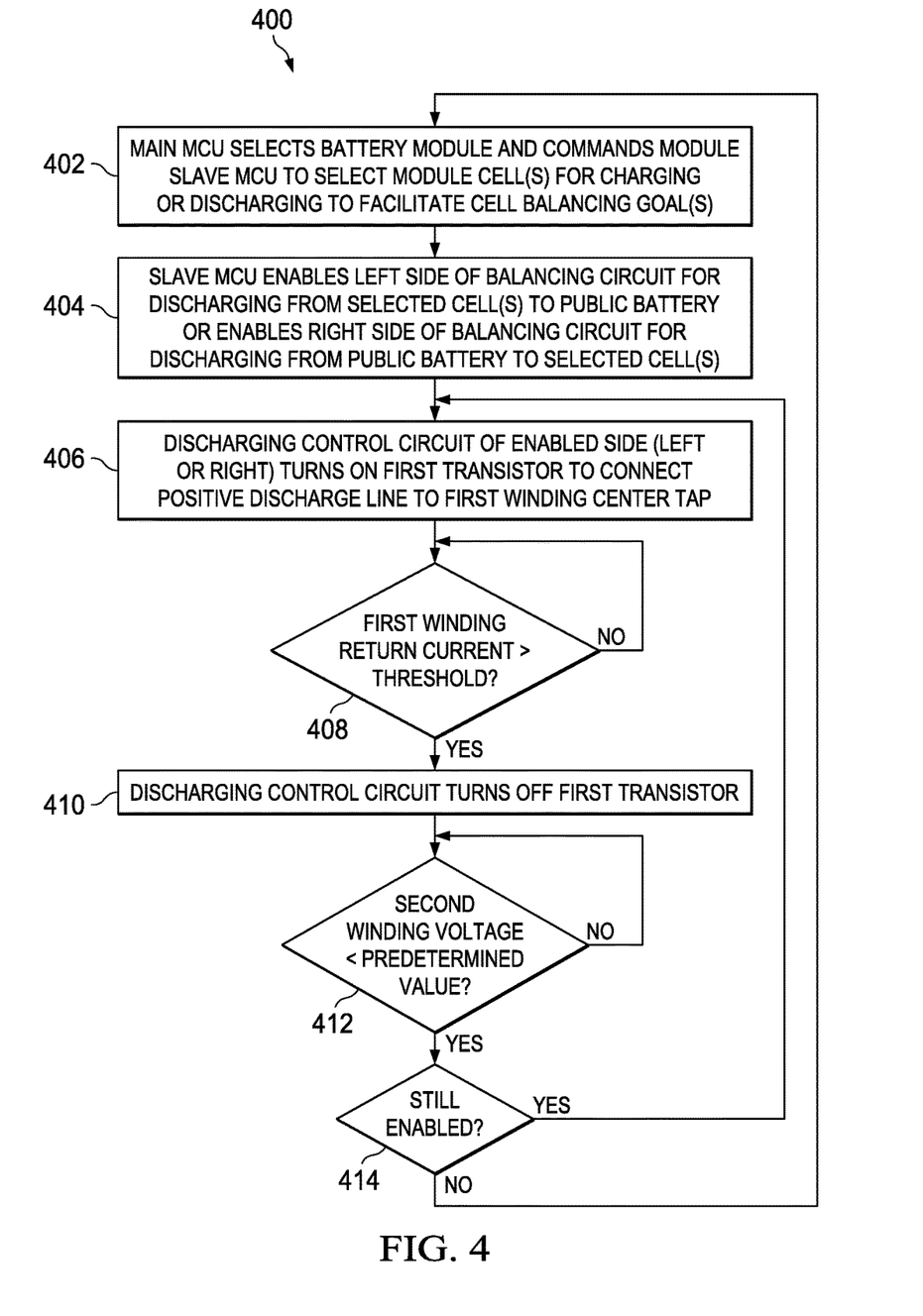
FIG. 4 is a flow diagram illustrating a charging or balancing method.

Referring now to FIGS. 3 and 4, FIG. 4 shows a process or method 400 for battery charging, discharging and/or battery balancing, which can be implemented using the balancing circuit 200 in the battery module or apparatus 100. The operation of the balancing circuit 200 as described below in the context of transferring charge from one of the battery cells B to the public battery 110. At 402 in FIG. 4, the main processor 102 (FIG. 1) selects a battery module 100, and commands the slave processor 220 of that module 100 (FIG. 2) to select one or more module battery cells B for charging or discharging in order to facilitate or implement one or more cell balancing goals, including charging, discharging, etc. At 404 in FIG. 4, the slave MCU 220 in one example enables the left side of the balancing circuit 200 by providing the first enable signal at the lines 205 and 206 to the first opto-coupler 341 (FIG. 3) to initiate discharging from the selected battery cell or cells B to the second battery 110. In this example, the left side of the balancing circuit 200 is referred to as the discharging side, and the first control circuit 314 is referred to as the discharging control circuit.

Figure 5:
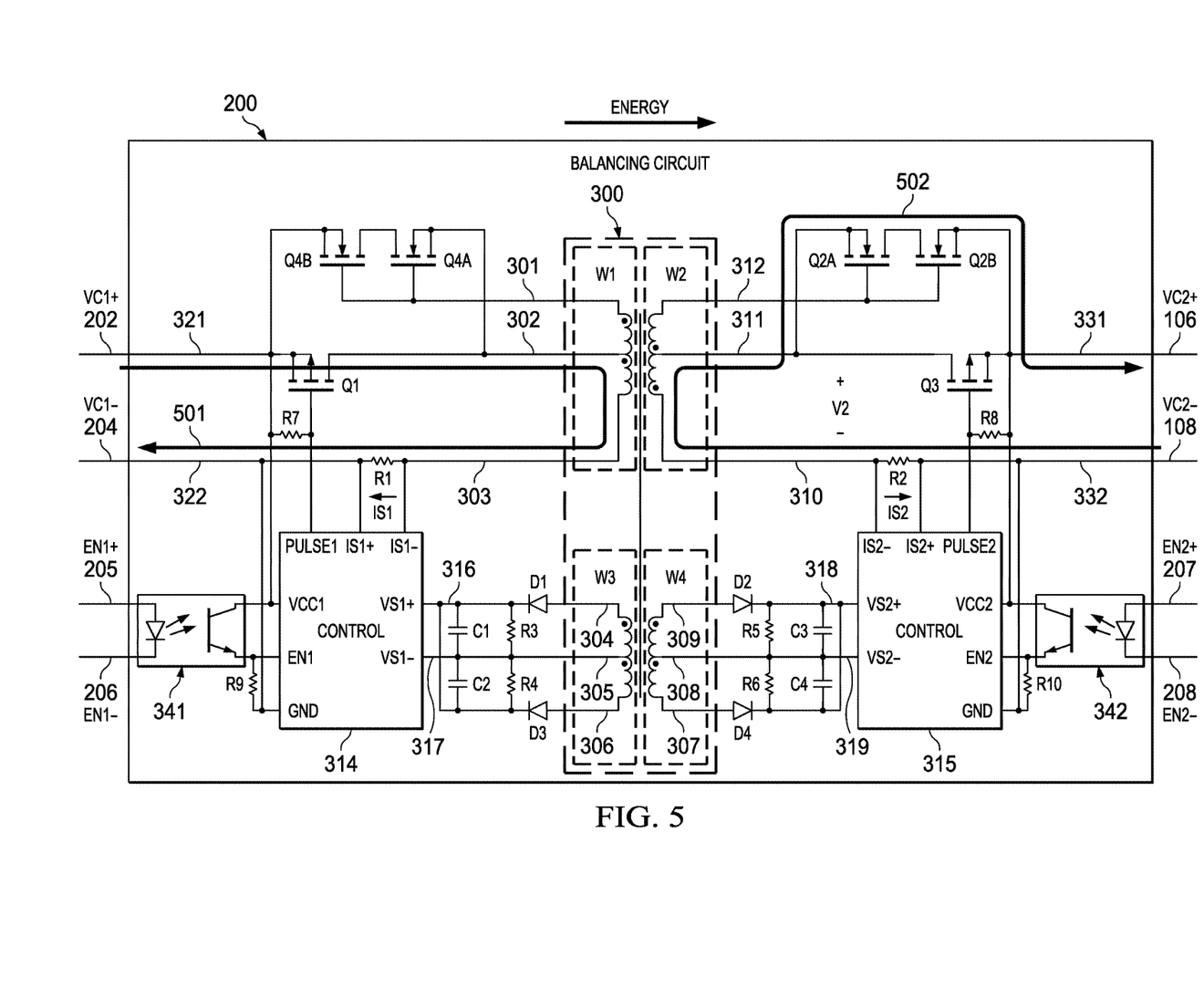
FIG. 5 is a schematic diagram illustrating the balancing circuit of FIG. 3 transferring charge from one or more selected battery cells to the public battery.

FIG. 5 shows operation of the balancing circuit 200 transferring charge from one or more of the selected battery cells B to the public battery 110, with the charge or energy being transferred from left to right as shown in FIG. 5. At 406 in FIG. 4, the first (discharging) control circuit 314 turns on the first transistor Q1 in response to the first isolated enable signal EN1 transitioning to the first state (e.g., high voltage at the EN1 input). In one example, the first control circuit 314 pulls the gate of Q1 low to turn on Q1 and begin a charge transfer cycle to allow current flow IS1 in the first winding W1. The resulting current IS1 flows along a first path 501 in FIG. 5 from the positive battery connection 321 through the first transistor Q1 into the center tap 302 of the first winding W1. The current IS1 flows out of the transformer 300 at the lower end 303, and through the current sense resistor R1, returning to the negative battery connection 322. Due to the inductance of the winding W1, the discharging side current flow increases over time while Q1 is turned on to charge the inductance of W1. At 408 in FIG. 4, the first control circuit 314 monitors the current sense signal IS1 (e.g., the voltage across R1) to determine whether the discharging side current flow exceeds a threshold. If not (NO at 408), the control circuit 314 maintains Q1 in the on state.

When the current IS1 reaches or exceeds the threshold (YES at 408), the discharging control circuit 314 turns off Q1 at 410. Turning off Q1 induces a voltage in the second winding W2 at the right side of the transformer 300. Once this induced voltage exceeds the threshold gate-source voltage of the second transistors Q2A and Q2B, these transistors turn on in response to the induced voltage in W2. Turning on Q2A and Q2B allows the associated induced current IS2 to flow along a second current path 502 in FIG. 5 out of the center tap 311, through Q2A and Q2B and into the positive terminal of the second battery 110 at line 106, returning from the negative terminal of the battery 110 at line 108, through R2, and into the lower end 310 of the winding W2. The charging side current IS2 when Q2 is turned on at time t is given by the following equation (1):

$$IS2|t=Q2on=(L1/L2)IS1|-Q1off \quad (1)$$

L1 is the inductance between lines 302 and 303 of the transformer 300, L2 represents the inductance between the lines 311 and 310 of the transformer 300, IS1 is the immediate value of the discharging side current just before Q1 is turned off, and IS2 is the immediate value of the charging side current just after Q2A and Q2B are turned on. The voltage V2 between the transformer lines 311 and 310 is approximately equal to the discharging battery voltage between VC2+VC2−, minus any voltage drops along the conduction path 502 of the charging side current IS2. The voltages on the other transformer terminals are determined by the voltage V2 based on the turns ratio of each winding relative to the number of turns in the coil between lines 310 and 311. The charging side current IS2 tapers down over time, and eventually reaches 0 at a rate according to equation (2) below:

$$dIS2/dt=-V2/L2 \quad (2)$$

In this manner, the first battery B on the primary side is discharged, and the secondary side public battery 110 is charged in a charge transfer cycle through the charge transfer operation from left to right in the balancing circuit 200 of FIGS. 3 and 5.

While the first enable signal EN1 remains in the first active state, the first control circuit 314 continues with one or more further charge transfer cycles through operation of the third winding W3 and the first rectifier circuit. The second and any subsequent charge transfer cycles are initiated (while EN1 remains active) by the control circuit 314 in response to a signal from the third winding W3 indicating that the current flow IS2 in the second winding W2 is, or transitions, to or below a predetermined value, such as zero and one example. In this case, when IS2 tapers to zero or some other predetermined value, the voltage at VC2+, VC2− is blocked by the second and third transistors Q2A, Q2B and Q3. As a result, V2 drops to 0, and the voltages across the other coils and windings of the transformer 300 also drop to 0.

The currents IS1 and IS2 flowing along the paths 501 and 502 in FIG. 5 induce a voltage in the third winding W3, and the first rectifier circuit diodes D1 and D3 rectify the induced voltage, with low pass filtering provided by C1, C2, R3 and R4 to provide a first rectifier output voltage signal at the line 316 relative to the line 317 (at the VS1+ and VS1− inputs of the first control circuit 314). The first control circuit 314 monitors the first rectifier output signal, and determines at 412 whether this signal indicates zero current flow in the second winding W2. For example, after turning on Q1 to begin a given charge transfer cycle, the first control circuit 314 monitors the first rectifier output signal at line 316, and compares this with zero or another suitable predetermined value. While the secondary side voltage of the coil W2 remains above a predetermined value (NO at 412), the first control circuit 314 maintains Q1 off.

Once the rectified voltage signal transitions below a predetermined value, this indicates that the voltage of the second winding W2 has also transitioned below a corresponding predetermined value. In response to the first rectifier output signal indicating current flow in W2 below the predetermined value (YES at 412), the first control circuit 314 determines whether the first enable signal EN1 remains in the first state at 414. If so (YES at 414), the first control circuit 314 provides a further pulse signal (e.g., low going signal PULSE1) to again turn on the first transistor Q1. Turning on Q1 repeats the process at 406-414 as described above. In this manner, the charge transfer to discharge the selected battery cell or cells B and to charge the second battery 110 continues in a series of charge transfer cycles. Once the desired amount of charge transfer has been achieved, the slave processor 220 (FIG. 2) deactivates the first control circuit 314 by discontinuing the enable signal EN1 (NO at 414 in FIG. 4), and the process 400 returns to 402 as previously described.

As seen in FIGS. 3 and 5, the first control circuit 314 uses information obtained via a signal of the third winding W3, and thus the control circuit 314 remains electrically and galvanically isolated from the secondary side of the isolation barrier provided by the transformer 300, while obtaining information from the secondary side used to individually initiate a series of charge transfer cycles initiated by turning Q1 on. The signal from the winding W3 is obtained in the illustrated example using the first rectifier circuit D1, D3, R3, R4, C1 and C2. Other forms of signal conditioning circuitry can be used by which the control circuit 314 can ascertain whether the secondary side current flow IS2 has reached zero or some other predetermined value based on a signal from a transformer winding W3. The illustrated example includes a dual diode rectifier using a center-tapped transformer winding W3. However, other embodiments are possible in which the third winding W3 does not need to have a center tap, and a single rectifier diode can be used with or without filtering components such as capacitors and/or resistors.

Figure 6:
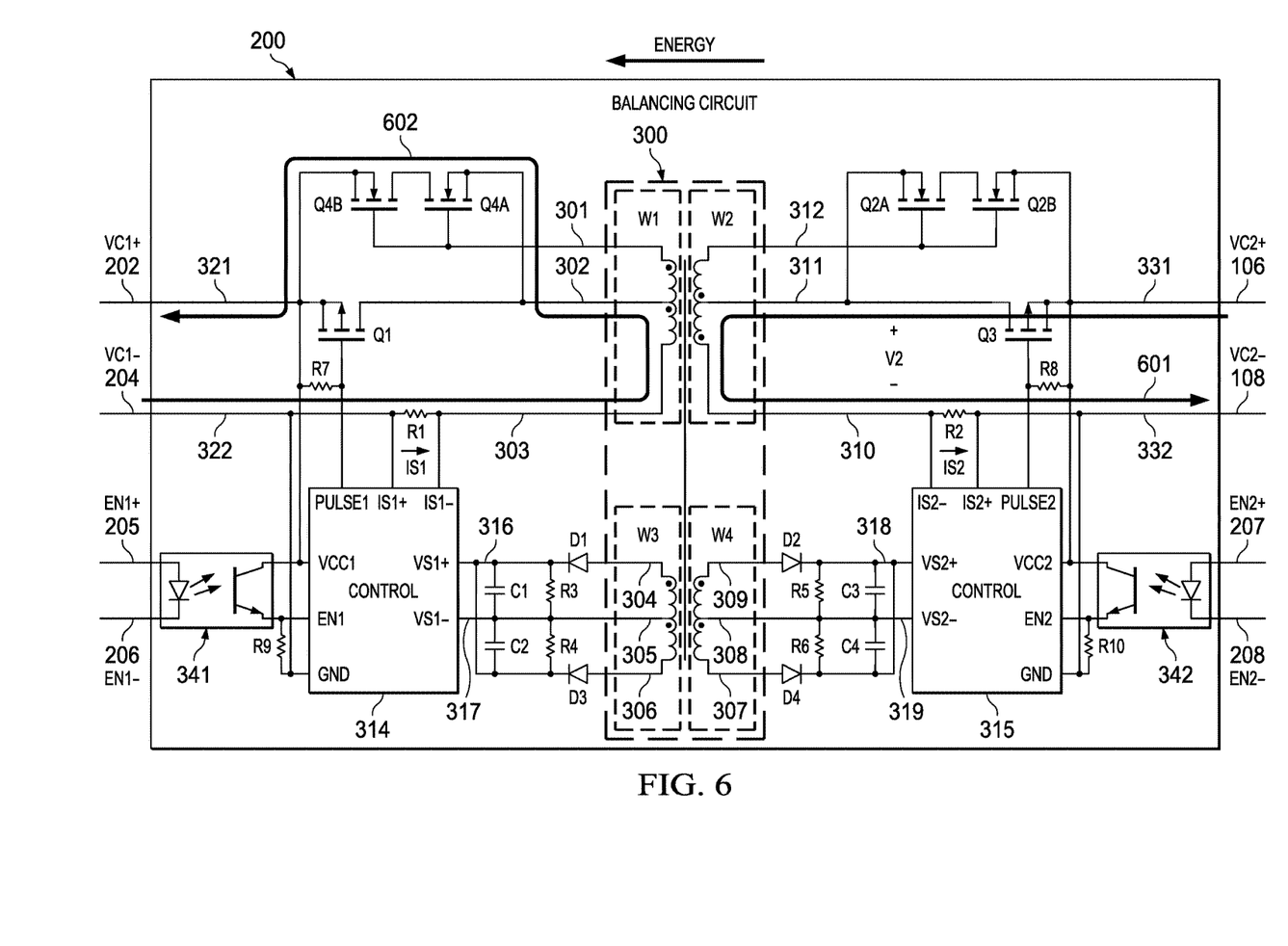
FIG. 6 is a schematic diagram illustrating the balancing circuit of FIG. 3 transferring charge from the public battery to one or more selected battery cells.

Referring also to FIG. 6, the illustrated balancing circuit 200 provides bidirectional charge transfer capability. In FIG. 6, the slave controller 220 deactivates the first control circuit 314 and activates the second control circuit 315 via a second enable signal EN2 applied to the second opto-coupler 342. An isolated second enable signal EN2 is provided to the EN2 input of the second control circuit 315 to initiate transfer of charge or energy from right to left in FIG. 6 (e.g., from a connected second battery 110 to a selected battery cell or cells B). As seen in FIG. 6, the second control circuit turns on Q3 to allow current flow IS2 along a first path 601 from the positive battery connection 331 through Q3, and into the center tap 311 of the second winding W2. This current continues out of the lower end 310 and through the second sense resistor R2, returning to the negative terminal of the second battery via the battery connection 332. Once the current IS2 reaches a threshold value, the second control circuit 315 turns off Q3, which induces a voltage between the winding lines 301 and 302 of the first winding W1. The induced voltage in the first winding W1 turns on the fourth transistors Q4A and Q4B. This allows a current IS1 to flow along a second path 602 from the first winding center tap 302 through transistors Q4A and Q4B and into the positive battery connection 321. This current returns through the negative battery connection 322, the resistor R1, and into the lower winding end 303. The second control circuit 315 monitors an induced signal from the fourth winding W4 through the second rectifier circuit (e.g., a second rectifier output voltage signal between lines 318 and 319). Once the second rectifier output signal falls to a predetermined value (e.g., 0), if the second enable signal EN2 remains activated, the second control circuit 315 initiates a subsequent charge transfer cycle.

The illustrated balancing circuit 200 thus provides bidirectional charge transfer capability. In another example, a unidirectional balancing circuit 200 can be provided as described above, with the fourth winding W4, the second rectifier circuit, the second control circuit 315, the second opto-coupler 342, Q3 and R2 being omitted, or remaining deactivated.

The balancing circuit 200 and the described example battery apparatus 100 advantageously use the induced voltage of a coil (e.g., W3, or W4) of the transformer 300 as an isolated signal source to determine the start point of successive balancing cycles. In certain examples, no silicon connection is needed between the two sides of the transformer 300, which facilitates maintenance of a high voltage isolation barrier between the discharged battery and the charged battery. The disclosed examples provide active charging, discharging and/or balancing functionality without the use of DC-DC converter circuitry, and achieve advantageous cost and size savings compared with prior active balancing approaches, while facilitating improved efficiency and performance compared with passive balancing circuits.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. A battery apparatus, comprising:
    a plurality of first battery cells connected in series with one another;
    a switching circuit to selectively couple first and second switching circuit nodes with a selected battery cell of the plurality of first battery cells;
    a balancing circuit to transfer charge between the selected battery cell and a second battery, the balancing circuit including:
    a first pair of battery connections coupled with the first and second switch circuit nodes,
    a second pair of battery connections to couple with a second battery,
    a transformer, including:
    a first winding wound around a transformer core and coupled with the first pair of battery connections,
    a second winding wound around the transformer core and coupled with the second pair of battery connections, and
    a third winding wound around the transformer core,
    a first rectifier circuit coupled to receive a signal from the third winding, the first rectifier circuit operative to provide a first rectifier output signal according to the signal from the third winding,
    a first transistor coupled between the first pair of battery connections and the first winding, the first transistor including a first control terminal,
    a second transistor coupled between the second pair of battery connections and the second winding, the second transistor including a second control terminal coupled to receive a signal from the second winding responsive to current flow in the first winding to allow current flow between the second winding and the second pair of battery connections, and
    a first control circuit responsive to a first enable signal transitioning to a first state to provide a first pulse signal to the first control terminal of the first transistor to turn on the first transistor to allow current flow in the first winding, the first control circuit being responsive to the first rectifier output signal indicating current flow in the second winding below a threshold value while the first enable signal remains in the first state to provide a further pulse signal to the first control terminal of the first transistor to again turn on the first transistor.

2. The battery apparatus of claim 1, wherein the first control circuit is operative to turn off the first transistor responsive to a first current sense signal indicating current flow in the first winding exceeding a first threshold.

3. The battery apparatus of claim 2, wherein the balancing circuit includes a first resistor coupled between the first pair of battery connections and the first winding to provide the first current sense signal to the first control circuit.

4. The battery apparatus of claim 1, wherein the balancing circuit includes a first opto-coupler that receives the first enable signal and provides a first isolated enable signal to the first control circuit, the first control circuit operative to turn on the first transistor responsive to the first isolated enable signal transitioning to a first state.

5. The battery apparatus of claim 1, wherein the transformer includes a fourth winding wound around the transformer core; and wherein the balancing circuit includes:
    a third transistor coupled between the second pair of battery connections and the second winding, the third transistor including a third control terminal;
    a fourth transistor coupled between the first pair of battery connections and the first winding, the fourth transistor including a fourth control terminal coupled to receive a signal from the first winding responsive to current flow in the second winding to allow current flow between the first winding and the first pair of battery connections;

a second rectifier circuit coupled to receive a signal from the fourth winding, the second rectifier circuit operative to provide a second rectifier output signal according to the signal from the fourth winding; and a second control circuit responsive to a second enable signal transitioning to a first state to provide a second pulse signal to the third control terminal of the third transistor to turn on the third transistor to allow current flow in the second winding, the second control circuit being responsive to the second rectifier output signal indicating current flow in the first winding below a second threshold value while the second enable signal remains in the first state to provide a further pulse signal to the third control terminal of the third transistor to again turn on the third transistor.

6. The battery apparatus of claim 5, wherein the second control circuit is responsive to a second current sense signal indicating current flow in the second winding exceeding a second threshold to turn off the third transistor.

7. The battery apparatus of claim 6, wherein the balancing circuit includes a second resistor coupled between the second pair of battery connections and the second winding to provide the second current sense signal to the second control circuit.

8. The battery apparatus of claim 5, wherein the balancing circuit includes a second opto-coupler that receives the second enable signal and provides a second isolated enable signal to the second control circuit, the second control circuit responsive to the second isolated enable signal transitioning to a first state to turn on the second transistor.

9. The battery apparatus of claim 5, wherein the first control circuit is powered via the first pair of battery connections; and wherein the second control circuit is powered via the second pair of battery connections.

10. The battery apparatus of claim 1, wherein the first control circuit is powered via the first pair of battery connections.

11. A balancing circuit, comprising:
a first pair of battery connections to couple with a first battery;
a second pair of battery connections to couple with a second battery;
a transformer, including:
a first winding wound around a transformer core and coupled with the first pair of battery connections,
a second winding wound around the transformer core and coupled with the second pair of battery connections, and
a third winding wound around the transformer core;
a first transistor coupled between the first pair of battery connections and the first winding, the first transistor including a first control terminal;
a second transistor coupled between the second pair of battery connections and the second winding, the second transistor including a second control terminal coupled to receive a signal from the second winding responsive to current flow in the first winding to allow current flow between the second winding and the second pair of battery connections, the second transistor comprising a pair of series connected field effect transistors each having a gate terminal coupled to the second control signal and each having body diodes, the series connected pair of field effect transistors arranged so that the body diodes oppose unwanted current flow between the second winding and the second pair of battery connections; and a first control circuit responsive to a first enable signal transitioning to a first state to provide a first pulse signal to the first control terminal of the first transistor to turn on the first transistor to allow current flow in the first winding, the first control circuit being responsive to a signal indicating current flow in the second winding below a predetermined value while the first enable signal remains in the first state to provide a further pulse signal to the first control terminal of the first transistor to again turn on the first transistor.

12. The balancing circuit of claim 11, wherein the first control circuit is operative to turn off the first transistor responsive to a first current sense signal indicating current flow in the first winding exceeding a first threshold.

13. The balancing circuit of claim 12, comprising a first resistor coupled between the first pair of battery connections and the first winding to provide the first current sense signal to the first control circuit.

14. The balancing circuit of claim 11, comprising a first opto-coupler that receives the first enable signal and provides a first isolated enable signal to the first control circuit, the first control circuit operative to turn on the first transistor responsive to the first isolated enable signal transitioning to a first state.

15. The balancing circuit of claim 11, comprising a first rectifier circuit coupled to receive a signal from the third winding, the first rectifier circuit operative to provide a first rectifier output voltage signal to the first control circuit responsive to the signal from the third winding, wherein the first control circuit is responsive to the first rectifier output signal indicating current flow in the second winding below a predetermined value while the first enable signal remains in the first state to provide the further pulse signal to the first control terminal of the first transistor to again turn on the first transistor.

16. The balancing circuit of claim 11, wherein the transformer further includes a fourth winding wound around the transformer core; the balancing circuit further comprising:
a third transistor coupled between the second pair of battery connections and the second winding, the third transistor including a third control terminal;
a fourth transistor coupled between the first pair of battery connections and the first winding, the fourth transistor including a fourth control terminal coupled to receive a signal from the first winding responsive to current flow in the second winding to allow current flow between the first winding and the first pair of battery connections;
a second control circuit responsive to a second enable signal transitioning to a first state to provide a second pulse signal to the third control terminal of the third transistor to turn on the third transistor to allow current flow in the second winding, the second control circuit being responsive to the second rectifier output signal indicating current flow in the first winding below a threshold value while the second enable signal remains in the first state to provide a further pulse signal to the third control terminal of the third transistor to again turn on the third transistor.

17. The balancing circuit of claim 16, wherein the first control circuit is powered via the first pair of battery connections; and wherein the second control circuit is powered via the second pair of battery connections.

18. The balancing circuit of claim 16,
wherein the first winding includes a first end, a second end and a center tap;
wherein the first transistor is connected between the center tap of the first winding and a first battery connection of the first pair of battery connections;
wherein the fourth transistor is connected in parallel with the first transistor between the center tap of the first winding and the first battery connection of the first pair of battery connections;
wherein the fourth control terminal of the fourth transistor is connected to the first end of the first winding;
wherein a second battery connection of the first pair of battery connections is coupled with the second end of the first winding;
wherein the second winding includes a first end, a second end and a center tap;
wherein the third transistor is connected between the center tap of the second winding and a first battery connection of the second pair of battery connections;
wherein the second transistor is connected in parallel with the third transistor between the center tap of the second winding and the first battery connection of the second pair of battery connections;
wherein the second control terminal of the second transistor is connected to the first end of the second winding; and
wherein a second battery connection of the second pair of battery connections is coupled with the second end of the second winding.

19. The balancing circuit of claim 11,
wherein the first winding includes a first end, a second end and a center tap;
wherein the first transistor is connected between the center tap of the first winding and a first battery connection of the first pair of battery connections;
wherein a second battery connection of the first pair of battery connections is coupled with the second end of the first winding;
wherein the second winding includes a first end, a second end and a center tap;
wherein the second transistor is connected between the center tap of the second winding and a first battery connection of the second pair of battery connections;
wherein the second control terminal of the second transistor is connected to the first end of the second winding; and
wherein a second battery connection of the second pair of battery connections is coupled with the second end of the second winding.

20. A circuit to transfer charge between batteries, comprising:
a transformer, including a first winding coupled with a first battery, a second winding coupled with a second battery, and a third winding, the first, second and third windings being magnetically coupled with one another;
a first transistor coupled between the first battery and the first winding;
a control circuit operative, in response to an enable signal in a first state, to turn on the first transistor to begin a charge transfer cycle to allow current flow in the first winding, to discharge the first battery, and to cause an induced voltage in the second and third windings; and
a second transistor coupled between the second battery and the second winding, the second transistor operative in response to the induced voltage in the second winding to allow current flow between the second winding and the second battery to charge the second battery;
a rectifier circuit coupled to receive a signal from the third winding and to output a first rectifier output signal responsive to the signal from the third winding;
the control circuit being responsive to the first rectifier output signal indicating that current flow in the second winding is below a predetermined value while the enable signal remains in the first state to again turn on the first transistor to begin a second charge transfer cycle.

\* \* \* \* \*